3,721,663
Patented Mar. 20, 1973

3,721,663
NOVEL METHOD FOR PREPARING ASCORBIC ACID COMPOUNDS AND NOVEL INTERMEDIATES FOR PREPARING SAME
David F. Hinkley, Plainfield, and Alexander M. Hoinowski, Union, N.J., assignors to Merck & Co., Inc., Rahway, N.J.
No Drawing. Continuation-in-part of application Ser. No. 689,287, Dec. 11, 1967. This application Mar. 2, 1970, Ser. No. 15,958
Int. Cl. C07c *47/18*
U.S. Cl. 260—210 R         5 Claims

ABSTRACT OF THE DISCLOSURE

Process for preparing ascorbic acid compounds by catalytic oxidation of a loweralkyl sorboside or loweralkyl fructoside to form the corresponding glycosidic acid which is then simultaneously hydrolyzed and lactonized. Novel α-loweralkyl glycoside of 2-keto-gulonic acid is useful as an intermediate in the preparation of ascorbic acid.

CROSS REFERENCES TO RELATED APPLICATIONS

This is a continuation-in-part of copending application Ser. No. 689,287, filed Dec. 11, 1967, and now abandoned.

BACKGROUND OF THE INVENTION

(1) Field of the invention

Vitamins, ascorbic acid, isoascorbic acid, glycosides.

(2) Description of the prior art

The prior art methods for preparing ascorbic acid are modifications of the early process described by Reichstein. In this process D-glucose is converted into the alcohol, D-sorbitol, by catalytic hydrogenation, and this upon bacterial oxidation yields the 2-ketohexose, L-sorbose. The next step is introduction of a carboxyl group at carbon 1 by oxidation of the primary alcohol at that position in L-sorbose. In order to protect the other oxidative sensitive groups in the molecule, L-sorbose is first converted into its diacetone derivative. After the desired oxidation is carried out, the acetone derivative is readily hydrolyzed to the free 2-keto-L-gluonic acid, which can then be lactonized and enolized to ascorbic acid.

Subsequent modifications of this basic process are confined either to improved methods for preparing the doubly blocked L-sorbose derivative or with the subsequent rearrangement of the 2-keto acid. The disadvantages of the prior art method are due mainly to the cumbersome and thus costly manipulative steps necessary in forming the diacetone derivative of L-sorbose. In this step L-sorbose is reacted with a gross excess of acetone, despite which not only is the desired diacetone derivative of L-sorbose formed, but also substantial amounts of mono-acetone L-sorbose. In order to efficiently practice the prior art method, it is therefore necessary to separate and remove the mono-acetone L-sorbose and allow it to be recycled to form more of the diacetone derivative. This latter step is quite complex and thus costly and undesirable from a process standpoint. In addition, since large quantities of acetone must be used, it is necessary that steps be taken to recover and rectify the excess not consumed in the reaction, a step which also adds to the cost, particularly when there is considered the losses which usually occur.

SUMMARY OF THE INVENTION

The object of this invention is provision of novel methods for preparing xylo and arabo ascorbic acids by the catalytic oxidation of a loweralkyl ketoside of L-sorbose and D-fructose (loweralkyl sorboside or loweralkyl fructoside) to form the corresponding glycosidic acid which is then simultaneously hydrolyzed and lactonized to form the corresponding xylo or arabo ascorbic acid.

Another object of this invention is provision of novel loweralkyl-α-L-xylo-hexulopyranosidonic acid useful as intermediates in the preparation of ascorbic acid.

Another object of this invention is provision of a novel mixture of loweralkyl-D-arabo-hexulopyranosidonic acid and loweralkyl-D-arabo-hexulofuranosidonic acid useful as intermediates in the preparation of arabo ascorbic acid also known as isoascorbic acid.

DESCRIPTION OF THE PREFERRED EMBODIMENTS

We have found that xylo and arabo ascorbic acids may be prepared from simple glycosides of L-sorbose and D-fructose, suitably an α-loweralkyl sorboside or loweralkyl fructoside. The process according to the present invention comprises catalytically oxidizing an α-loweralkyl sorboside or loweralkyl fructoside with oxygen or an oxygen containing gas and in the presence of a noble metal catalyst, to the corresponding glycosidic acid, namely a loweralkyl-α-L-xylo-hexulopyranosidonic acid, or loweralkyl-D-arabo-hexulofuranosidonic acid and loweralkyl-D-arabohexulopyranosidonic acids, and then simultaneously hydrolyzing and lactonizing the keto acid with a mineral acid to form the corresponding ascorbic acid.

This process may be schematically represented as follows:

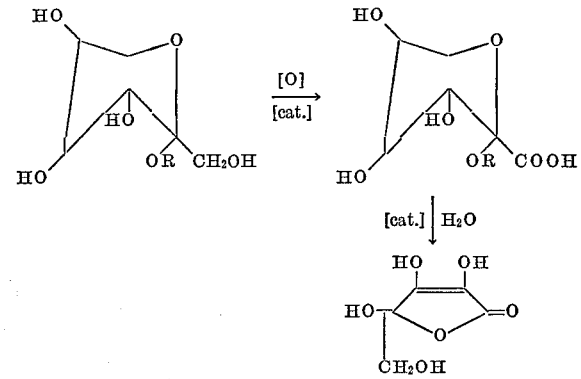

wherein R represents loweralkyl having 1–6 carbon atoms.

In carrying out the process of the present invention for the preparation of xylo-ascorbic acid, a loweralkyl sorboside such as α-methyl, ethyl, propyl, isopropyl, or t-butyl sorboside is catalytically oxidized to the corresponding α-methyl, ethyl, propyl, isopropyl, or t-butyl glycoside of 2-keto-L-gulonic acid by contacting the respective α-loweralkyl sorboside in an aqueous alkaline solution with a catalyst such as ruthenium, rhenium, palladium, and preferably platinum, while simultaneously subjecting the reaction mixture to a continuous stream of oxygen at a temperature of approximately 0° C. to 100° C., preferably 70–90° C.

In carrying out the process of the present invention for the preparation of arabo ascorbic acid or isoascorbic acid, a loweralkyl fructoside such as methyl, ethyl, propyl, isopropyl, or t-butyl fructoside which consists of a mixture of loweralkyl furano and pyranosides is catalytically oxidized to a mixture of the corresponding loweralkyl hexulofuranosidonic acid and loweralkyl hexulopyranosidonic acid employing the same conditions as stated above.

The oxygen required for the catalytic oxidation in accordance with the invention may be added in the form of pure oxygen or oxygen-containing inert carrier gas, preferably air. Any desired oxygen concentration and thus rate of gas flow may be used, providing adequate distribution by violent mechanical agitation is secured The noble metal catalyst employed should be present in a finely divided state and in a concentration of about 0.1–20 weight percent to the amount of ketoside, for example sorboside or fructoside utilized, although the concentration preferred is 2% by weight of the ketoside present.

In order to complete the oxidation and to protect the glycosidic linkage of the keto acid thus formed, it is necessary to maintain the pH of the reaction mixture at approximately 7.5 to 11, and preferably at about 8.5±1. In order to effect this pH the presence of a base is necessary. Although any weak inert base which is also nontoxic toward the catalyst may be satisfactorily employed, it is preferable that the base be an inorganic base such as an alkali metal carbonate, bicarbonate or acetate, exemplified by sodium carbonate, sodium bicarbonate, or sodium acetate. Other types of base that may be used are the resin bases such as the basic anion exchange resins, and particularly those composed of a quaternary ammonium exchange group attached to a polystyrene polymer lattice. These latter bases include such commercially available bases as Dowex IX and IR–400 (manufactured by Dow Chemical Corp. and Rohm and Haas, respectively).

Upon completion of the catalytic oxidation reaction, the catalyst is separated either by filtration, settling, or other suitable means, whereupon the aqueous filtrate is worked up to recover therefrom the crude salt of the glycosidic acid, namely the salt of loweralkyl-α-L-xylo-hexulopyranosidonic acid from loweralkyl sorboside or a mixture of the salt of loweralkyl-D-arabo-hexulofuranosidonic acid and loweralkyl-D-arabo-hexulopyranosidonic acid from the loweralkyl fructoside. If desired, this salt may then be further treated according to standard techniques to obtain the free acids.

The glycosidic acids can be hydrolyzed and simultaneously lactonized to produce ascorbic acid by heating in the presence of water. Thus, the hydrolysis can be effected autocatalytically by heating an aqueous solution of the glycosidic acid at elevated temperatures under pressure. Alternatively, the hydrolysis is effected by treating the glycosidic acid in the presence of an acid catalyst. For example, the hydrolysis is effected by treating the glycosidic acid in an aqueous solution of sulfur dioxide or, preferably, in an aqeous solution of a non-oxidizing mineral acid such as hydrohalic acid, sulfuric acid, phosphoric acid, or an organic acid such as formic acid, acetic acid, and trihaloacetic acid. The hydrolysis can be carried out in aqueous solutions of acetic acid, acetone, or dimethylsulfoxide, as well as water-immiscible solvents such as benzene, methyl-isobutyl ketone and the like. Hydrolysis can also be accomplished by treating the glycosidic acid with an acid catalyst in dry solvents such as acetic acid, acetone, or dimethylsulfoxide. It is advantageous if the hydrolysis is effected at a temperature of about 20°–100° C. For the obtention of maximum yields of ascorbic acid, it is preferred to effect the hydrolysis by heating the glycosidic acid in concentrated hydrochloric acid at a temperature of 70–90° C. for sufficient time to complete the hydrolysis. The ascorbic acid is then recovered from the resulting solution in accordance with methods known in this art.

The loweralkyl ketoside used as the starting reactant in our novel process may be prepared by alkylating L-sorbose or D-fructose with a suitable alkylating agent such as a loweralkanol having 1–6 carbon atoms or an active olefin such as isobutene in the presence of a hydrogen halide or a non-oxidizing mineral acid such as phosphoric or hydrochloric acid. The resulting α-loweralkyl sorboside may then be recoverd from the reaction mixture by neutralization of the catalyst and obtained in pure form by extracting with conventional solvents by methods known in the art.

Thus, our invention provides a method for efficiently preparing xylo and arabo ascorbic acids from L-sorbose and D-fructose in a manner not heretofore described by the prior art. Xylo ascorbic acid is prepared by first forming a simple glycoside of L-sorbose, oxidizing the glycoside at carbon 1 to its corresponding glycosidic acid, and hydrolyzing and simultaneously lactonizing the acid. The formation of the glycoside at carbon 2 of L-sorbose effectively blocks the oxidation between carbons 1 and 2, and simultaneously at carbon 6, thus permitting L-sorbose to be selectively oxidized in high yield.

EXAMPLE 1

Methyl-α-L-xylo-hexulopyranosidonic acid

A suspension of 3.5 g. of platinum, derived from 4.06 g. of platinum oxide and hydrogen, 35.0 g. (0.180 mole) of α-methyl sorboside and 21 g. (0.250 mole) of sodium bicarbonate in 875 ml. of water is stirred under continuous air sparging for 12 hours at 60° C.

After 12 hours the mixture is filtered to remove the catalyst and the filtrate is concentrated in vacuo to form a tan syrup, which upon trituration with tetrahydrofuran, crystallizes. The residue obtained after filtering this mixture upon drying in vacuo at 25° C. yields 40 g. of a tan solid, containing the crude sodium salt of the glycosidic acid.

A solution of 8 g. of this crude salt in 100 ml. of water is neutralized by treating the solution with 2 portions of 5 g. each of a polystyrene nuclear sulfonic acid (Dowex 50–W–X4), which after filtering and concentration of combined filtrates in vacuo below 20°, yields a residual oil containing the free glycosidic acid. This oil is then crystallized first from 200 ml. of boiling nitroethane and then from 400 ml. of boiling ethyl acetate to give 1.5 g. of methyl-α-L-xylo-hexulopyranosidonic acid, M.P. 165–167° C.

The α-methyl sorboside used as the starting material in this example is a known compound and may be prepared according to the procedure described in Compt. rend. 199, 1231 (1934).

EXAMPLE 2

Ascorbic acid (L-xylo-ascorbic acid)

A solution of 4 g. of the crude sodium salt of methyl-α-L-xylo-hexulopyranosidonic acid in 12 ml. of concentrated hydrochloric acid is heated for 100 minutes at 85° C. The resulting dark solution is poured into 80 ml. of ice water, filtered to remove tars, and the filtrate diluted with 100 ml. of water. The filtrate is then chromatographed on 160 g. of a polystyrene trimethylbenzyl ammonium resin, [Dowex 1–X8 (Cl−)], in a 28 x 400 m. column, eluting with water. Fractions 200 ml. to 710 ml. are then saturated with sulfur dioxide and then concentrated in vacuo at 15° C. to a residual oil. The oil crystallizes from 15 ml. of boiling acetonitrile to give pure ascorbic acid, M.P. 187–189° C.

EXAMPLE 3

Mixture of Methyl-D-arabo-hexulofuranosidonic acid and methyl-D-arabo-hexulopyranosidonic acid A suspension of 3.5 g. of platinum, derived from 4.06 g. of platinum oxide and hydrogen, 35.0 g. (0.180 mole) of methyl fructoside and 21 g. (0.250 mole) of sodium bicarbonate in 875 ml. of water is stirred under continuous air sparging for 12 hours at 60° C.

After 12 hours the mixture is filtered to remove the catalyst and the filtrate is concentrated in vacuo to form a tan syrup, which upon trituration with tetrahydrofuran, crystallizes. The residue obtained after filtering this mixture upon drying in vacuo at 25° C. yields 40 g. of a tan solid, containing a mixture of the crude sodium salts of methyl-D-arabo-hexulofuranosidonic acid and methyl-D-arabo-hexulopyranosidonic acid.

A solution of 8 g. of this crude salt in 100 ml. of water is neutralized by treating the solution with 2 portions of 5 g. each of a polystyrene nuclear sulfonic acid (Dowex 50–W–X4), which after filtering and concentration of combined filtrates in vacuo below 20°, yields a yellow oil containing the free glycosidic acids.

The methyl fructoside used as the starting material in this example is a known mixture of furano and pyranosides and may be prepared according to the procedure described in J. Am. Chem. Soc., 56, 708 (1934).

EXAMPLE 4

Isoascorbic acid (D-arabo ascorbic acid)

A solution of 4 g. of a mixture of the crude sodium salt of methyl-D-arabo-hexulofuranosidonic acid and methyl-D-arabo-hexulopyranosidonic acid in 12 ml. of 6 N hydrochloric acid is heated for 20 minutes at 75° C. The resulting dark solution is poured into 80 ml. of ice water, filtered to remove tars, and the filtrate diluted with 100 ml. of water. The filtrate is then chromatographed on 160 g. of a polystyrene trimethylbenzyl ammonium resin, [Dowex 1–X8 (Cl⁻)], in a 28 x 400 m. column, eluting with water. Fractions 200 ml. to 710 ml. are then saturated with sulfur dioxide and then concentrated in vacuo at 15° C. to a residual oil. The oil crystallizes from 15 ml. of boiling acetonitrile to give isoascorbic acid, M.P. 174° C., (d).

What is claimed is:
1. A loweralkyl-α-L-xylo-hexulopyranosidonic acid.
2. Methyl-α-L-xylo-hexulopyranosidonic acid.
3. A composition of matter consisting of a loweralkyl-D-arabo-hexulopyranosidonic acid and a loweralkyl-D-arabo-hexulofuranosidonic acid.
4. The composition of matter of claim 3 consisting of methyl-D-arabo-hexulopyranosidonic acid and methyl-D-arabo-hexulofuranosidonic acid.
5. A process for preparing a mixture of a loweralkyl-D-arabo-hexulopyranosidonic acid and a loweralkyl-D-arabo-hexulofuranosidonic acid which consists of contacting a loweralkyl fructoside in an aqueous alkaline solution of pH 7.5–11 with oxygen and from 0.1–20% by weight of a noble metal catalyst.

References Cited

UNITED STATES PATENTS

| | | | |
|---|---|---|---|
| 2,189,778 | 2/1940 | Dalmer et al. | 260—343.7 |
| 2,190,377 | 2/1940 | Dalmer et al. | 260—343.7 |
| 2,318,500 | 5/1943 | King et al. | 260—209 |
| 2,483,251 | 9/1949 | Trenner | 260—343.7 |
| 2,845,439 | 7/1958 | Reiners | 260—210 |

ELBERT L. ROBERTS, Primary Examiner

J. R. BROWN, Assistant Examiner

U.S. Cl. X.R.

260—343.7